US010250638B2

(12) United States Patent
Lord et al.

(10) Patent No.: US 10,250,638 B2
(45) Date of Patent: Apr. 2, 2019

(54) CONTROL OF TRANSMISSION TO A TARGET DEVICE WITH A CLOUD-BASED ARCHITECTURE

(71) Applicant: Elwha LLC, Bellevue, WA (US)

(72) Inventors: Richard T. Lord, Tacoma, WA (US); Robert W. Lord, Seattle, WA (US); Craig J. Mundie, Seattle, WA (US); Clarence T. Tegreene, Mercer Island, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 13/678,010

(22) Filed: Nov. 15, 2012

(65) Prior Publication Data
US 2013/0298198 A1 Nov. 7, 2013

Related U.S. Application Data

(63) Continuation-in-part of application No. 13/462,283, filed on May 2, 2012, now abandoned, and a
(Continued)

(51) Int. Cl.
G06F 21/56 (2013.01)
H04L 29/06 (2006.01)
(Continued)

(52) U.S. Cl.
CPC ............ H04L 63/20 (2013.01); H04L 63/108 (2013.01); H04L 67/1002 (2013.01); H04W 4/02 (2013.01); H04W 4/60 (2018.02)

(58) Field of Classification Search
CPC ....... G06F 21/564; G06F 21/56; H04L 51/14; H04L 51/26; H04L 12/5865; H04L 63/1416
(Continued)

(56) References Cited

U.S. PATENT DOCUMENTS 6,377,565 B1 * 4/2002 Puckette, IV ................. 370/337
6,832,243 B1 12/2004 Mikalsen et al.
(Continued)

FOREIGN PATENT DOCUMENTS

WO WO 2007/113516 A1 10/2007
WO WO 2012/135557 A1 10/2012

OTHER PUBLICATIONS

PCT International Search Report; International App. No. PCT/US 13/70319; dated May 12, 2014; pp. 1-2.
(Continued)

Primary Examiner — Joseph P Hirl
Assistant Examiner — Kalish Bell

(57) ABSTRACT

Systems, methods, computer-readable storage mediums including computer-readable instructions and/or circuitry for control of transmission to a target device with a cloud-based architecture may implement operations including, but not limited to: detecting, at least in part via a cloud-based architecture, an elapsed time since a prior authorization of a transmission to a target device; comparing, at least in part via a cloud-based architecture, the elapsed time since a prior authorization of a transmission to a target device against a threshold transmission interval associated with a target device; and authorizing, at least in part via a cloud-based architecture, at least one transmission to a target device in response to the comparison.

36 Claims, 8 Drawing Sheets

Related U.S. Application Data continuation-in-part of application No. 13/678,082, filed on Nov. 15, 2012.

(51) Int. Cl.
*H04W 4/02* (2018.01)
*H04L 29/08* (2006.01)
*H04W 4/60* (2018.01)

(58) Field of Classification Search
USPC ........... 726/1–4, 11–12, 16–17, 21; 709/201, 709/203, 230–235
See application file for complete search history.

(56) References Cited

U.S. PATENT DOCUMENTS

| | | | |
|---|---|---|---|
| 7,460,874 B1 | 12/2008 | Hou et al. | |
| 7,707,276 B2* | 4/2010 | Brenes et al. | 709/220 |
| 8,281,027 B2 | 10/2012 | Martinez et al. | |
| 2002/0004840 A1* | 1/2002 | Harumoto et al. | 709/231 |
| 2002/0029285 A1 | 3/2002 | Collins | |
| 2002/0186665 A1 | 12/2002 | Chaffee et al. | |
| 2004/0003042 A1 | 1/2004 | Horvitz et al. | |
| 2004/0192213 A1 | 9/2004 | Dacosta | |
| 2004/0254998 A1 | 12/2004 | Horvitz | |
| 2004/0259559 A1 | 12/2004 | Li et al. | |
| 2005/0085240 A1* | 4/2005 | Fitzgerald | 455/456.1 |
| 2005/0219213 A1 | 10/2005 | Cho et al. | |
| 2005/0226201 A1 | 10/2005 | McMillin | |
| 2006/0133428 A1* | 6/2006 | Guthrie et al. | 370/519 |
| 2006/0236401 A1* | 10/2006 | Fosdick | 726/25 |
| 2007/0004466 A1 | 1/2007 | Haartsen | |
| 2007/0055733 A1 | 3/2007 | Maruyama | |
| 2007/0112970 A1* | 5/2007 | Kihara et al. | 709/230 |
| 2007/0155441 A1* | 7/2007 | Carbonaro | 455/571 |
| 2007/0265025 A1 | 11/2007 | Commarford et al. | |
| 2008/0046922 A1* | 2/2008 | Jankins et al. | 725/35 |
| 2008/0225890 A1* | 9/2008 | Howard | 370/468 |
| 2009/0129323 A1 | 5/2009 | Chen et al. | |
| 2009/0207777 A1 | 8/2009 | Stamoulis et al. | |
| 2010/0034177 A1 | 2/2010 | Santhanam | |
| 2010/0085948 A1* | 4/2010 | Yu et al. | 370/338 |
| 2010/0248768 A1* | 9/2010 | Nakatsugawa | 455/509 |
| 2010/0253801 A1 | 10/2010 | Konishi | |
| 2010/0287059 A1* | 11/2010 | McCoy et al. | 705/26 |
| 2011/0070898 A1* | 3/2011 | Sanjeev et al. | 455/456.2 |
| 2011/0167474 A1 | 7/2011 | Sinha et al. | |
| 2011/0183645 A1 | 7/2011 | Chawla | |
| 2011/0218951 A1 | 9/2011 | Kline et al. | |
| 2011/0314145 A1 | 12/2011 | Raleigh et al. | |
| 2012/0033682 A1 | 2/2012 | Corral | |
| 2012/0036261 A1 | 2/2012 | Salazar et al. | |
| 2012/0060041 A1* | 3/2012 | Hashimoto | 713/310 |
| 2012/0131184 A1 | 5/2012 | Luna et al. | |
| 2012/0155436 A1 | 6/2012 | Lindoff | |
| 2012/0185419 A1* | 7/2012 | Kuhn et al. | 706/12 |
| 2012/0197911 A1* | 8/2012 | Banka | G06F 17/30864 707/752 |
| 2012/0233656 A1* | 9/2012 | Rieschick et al. | 726/1 |
| 2012/0324106 A1 | 12/2012 | Chang et al. | |
| 2013/0018608 A1* | 1/2013 | Houston et al. | 702/61 |
| 2013/0070648 A1 | 3/2013 | Kubo et al. | |
| 2013/0155865 A1 | 6/2013 | Xu et al. | |
| 2013/0159220 A1 | 6/2013 | Winn et al. | |
| 2013/0205390 A1* | 8/2013 | Hauck et al. | 726/22 |
| 2013/0212185 A1* | 8/2013 | Pasquero et al. | 709/206 |
| 2013/0298183 A1 | 11/2013 | McGrath et al. | |
| 2014/0007175 A1* | 1/2014 | Cho et al. | 725/116 |

OTHER PUBLICATIONS

Excerpt from the Uspto Scientific and Technical Information Center (STIC); created on Jul. 11, 2014; pp. 1-3 (as provided by examiner) (best copy available).

European Search Report; European App. No. EP 13 85 5139; dated May 13, 2016 (received by our agent on May 20, 2016); pp. 1-7.

* cited by examiner

300

302 detecting, at least in part via a cloud-based architecture, an elapsed time since a prior authorization of a transmission to a target device 402 detecting, at least in part via a cloud-based architecture, an elapsed time since a prior authorization of a transmission to a target device in response to an enqueuing of a transmission 404 detecting, at least in part via a cloud-based architecture, an elapsed time since a prior authorization of a transmission to a target device in response to an enqueuing of a transmission 304 comparing, at least in part via a cloud-based architecture, the elapsed time since a prior authorization of a transmission to a target device against a threshold transmission interval associated with a target device 306 authorizing, at least in part via a cloud-based architecture, at least one transmission to a target device in response to the comparison

FIG. 4

```
                                                                    ← 300
┌─────────────────────────────────────────────────────────────────────┐
│ 302 detecting, at least in part via a cloud-based architecture, an │
│ elapsed time since a prior authorization of a transmission to a    │
│ target device                                                      │
└─────────────────────────────────────────────────────────────────────┘
                                    │
┌─────────────────────────────────────────────────────────────────────┐
│ 304 comparing, at least in part via a cloud-based architecture, the│
│ elapsed time since a prior authorization of a transmission to a    │
│ target device against a threshold transmission interval associated │
│ with a target device                                               │
│  ┌──────────────────┐  ┌──────────────────┐  ┌──────────────────┐  │
│  │ 502 comparing, at│  │ 504 comparing, at│  │ 506 comparing, at│  │
│  │ least in part via│  │ least in part via│  │ least in part via│  │
│  │ a cloud          │  │ a cloud          │  │ a cloud          │  │
│  │ architecture,    │  │ architecture,    │  │ architecture,    │  │
│  │ the elapsed time │  │ the elapsed time │  │ the elapsed time │  │
│  │ since an         │  │ since an         │  │ since an         │  │
│  │ authorization of │  │ authorization of │  │ authorization of │  │
│  │ a transmission   │  │ a transmission   │  │ a transmission   │  │
│  │ to a target      │  │ to a target      │  │ to a target      │  │
│  │ device against a │  │ device against a │  │ device against a │  │
│  │ threshold        │  │ threshold        │  │ threshold        │  │
│  │ transmission     │  │ transmission     │  │ transmission     │  │
│  │ interval         │  │ interval         │  │ interval         │  │
│  │ associated with  │  │ associated with  │  │ associated with  │  │
│  │ a serial number  │  │ a model          │  │ a network address│  │
│  │ of at least one  │  │ identifier of at │  │ of at least one  │  │
│  │ computing device │  │ least one        │  │ computing device │  │
│  │                  │  │ computing device │  │                  │  │
│  └──────────────────┘  └──────────────────┘  └──────────────────┘  │
└─────────────────────────────────────────────────────────────────────┘
                                    │
┌─────────────────────────────────────────────────────────────────────┐
│ 306 authorizing, at least in part via a cloud-based architecture,  │
│ at least one transmission to a target device in response to the    │
│ comparison                                                         │
└─────────────────────────────────────────────────────────────────────┘
```

FIG. 5

```
                                                                    ┌─ 300
                                                                ┌───┘
┌──────────────────────────────────────────────────────────────────┐
│ 302 detecting, at least in part via a cloud-based architecture,  │
│ an elapsed time since a prior authorization of a transmission    │
│ to a target device                                               │
└──────────────────────────────────────────────────────────────────┘
                                    │
┌──────────────────────────────────────────────────────────────────┐
│ 304 comparing, at least in part via a cloud-based architecture,  │
│ the elapsed time since a prior authorization of a transmission   │
│ to a target device against a threshold transmission interval     │
│ associated with a target device                                  │
│ ┌──────────────────────────────────────────────────────────────┐ │
│ │ 602 comparing, at least in part via a cloud-based            │ │
│ │ architecture, the elapsed time since a prior authorization   │ │
│ │ of a transmission to a target device against a threshold     │ │
│ │ transmission interval associated with context data           │ │
│ │ associated with a target device                              │ │
│ │ ┌──────────────┐ ┌──────────────┐ ┌──────────────┐           │ │
│ │ │604 comparing,│ │606 comparing,│ │608 comparing,│           │ │
│ │ │at least in   │ │at least in   │ │at least in   │           │ │
│ │ │part via a    │ │part via a    │ │part via a    │           │ │
│ │ │cloud         │ │cloud         │ │cloud         │           │ │
│ │ │architecture, │ │architecture, │ │architecture, │           │ │
│ │ │the elapsed   │ │the elapsed   │ │the elapsed   │           │ │
│ │ │time since an │ │time since an │ │time since an │           │ │
│ │ │authorization │ │authorization │ │authorization │           │ │
│ │ │of a          │ │of a          │ │of a          │           │ │
│ │ │transmission  │ │transmission  │ │transmission  │           │ │
│ │ │to a target   │ │to a target   │ │to a target   │           │ │
│ │ │device        │ │device        │ │device        │           │ │
│ │ │against a     │ │against a     │ │against a     │           │ │
│ │ │threshold     │ │threshold     │ │threshold     │           │ │
│ │ │transmission  │ │transmission  │ │transmission  │           │ │
│ │ │interval      │ │interval      │ │interval      │           │ │
│ │ │associated    │ │associated    │ │associated    │           │ │
│ │ │with a        │ │with a power  │ │with an       │           │ │
│ │ │geographical  │ │indicator of  │ │inertial      │           │ │
│ │ │identifier of │ │at least one  │ │signal of at  │           │ │
│ │ │at least one  │ │computing     │ │least one     │           │ │
│ │ │computing     │ │device        │ │computing     │           │ │
│ │ │device        │ │              │ │device        │           │ │
│ │ └──────────────┘ └──────────────┘ └──────────────┘           │ │
│ └──────────────────────────────────────────────────────────────┘ │
└──────────────────────────────────────────────────────────────────┘
                                    │
┌──────────────────────────────────────────────────────────────────┐
│ 306 authorizing, at least in part via a cloud-based              │
│ architecture, at least one transmission to a target device in    │
│ response to the comparison                                       │
└──────────────────────────────────────────────────────────────────┘
```

FIG. 6

```
                                                                    ┌─ 300
                                                                    ▼
┌─────────────────────────────────────────────────────────────────────┐
│ 302 detecting, at least in part via a cloud-based architecture, an │
│ elapsed time since a prior authorization of a transmission to a    │
│ target device                                                       │
└─────────────────────────────────────────────────────────────────────┘
                                    │
┌─────────────────────────────────────────────────────────────────────┐
│ 304 comparing, at least in part via a cloud-based architecture,    │
│ the elapsed time since a prior authorization of a transmission to  │
│ a target device against a threshold transmission interval          │
│ associated with a target device                                    │
│  ┌───────────────────────────────────────────────────────────────┐ │
│  │ 602 comparing, at least in part via a cloud-based             │ │
│  │ architecture, the elapsed time since a prior authorization    │ │
│  │ of a transmission to a target device against a threshold      │ │
│  │ transmission interval associated with context data            │ │
│  │ associated with a target device                               │ │
│  │  ┌────────────────┐ ┌────────────────┐ ┌────────────────┐   │ │
│  │  │ 802 comparing, │ │ 804 comparing, │ │ 806 comparing, │   │ │
│  │  │ at least in    │ │ at least in    │ │ at least in    │   │ │
│  │  │ part via a     │ │ part via a     │ │ part via a     │   │ │
│  │  │ cloud          │ │ cloud          │ │ cloud          │   │ │
│  │  │ architecture,  │ │ architecture,  │ │ architecture,  │   │ │
│  │  │ the elapsed    │ │ the elapsed    │ │ the elapsed    │   │ │
│  │  │ time since a   │ │ time since a   │ │ time since a   │   │ │
│  │  │ prior          │ │ prior          │ │ prior          │   │ │
│  │  │ authorization  │ │ authorization  │ │ authorization  │   │ │
│  │  │ of a           │ │ of a           │ │ of a           │   │ │
│  │  │ transmission   │ │ transmission   │ │ transmission   │   │ │
│  │  │ to a target    │ │ to a target    │ │ to a target    │   │ │
│  │  │ device         │ │ device         │ │ device         │   │ │
│  │  │ against a      │ │ against a      │ │ against a      │   │ │
│  │  │ threshold      │ │ threshold      │ │ threshold      │   │ │
│  │  │ transmission   │ │ transmission   │ │ transmission   │   │ │
│  │  │ interval       │ │ interval       │ │ interval       │   │ │
│  │  │ associated     │ │ associated     │ │ associated     │   │ │
│  │  │ with a signal  │ │ with a         │ │ with a         │   │ │
│  │  │ strength of at │ │ bandwidth of   │ │ connection     │   │ │
│  │  │ least one      │ │ at least one   │ │ type of at     │   │ │
│  │  │ computing      │ │ computing      │ │ least one      │   │ │
│  │  │ device         │ │ device         │ │ computing      │   │ │
│  │  │                │ │                │ │ device         │   │ │
│  │  └────────────────┘ └────────────────┘ └────────────────┘   │ │
│  └───────────────────────────────────────────────────────────────┘ │
└─────────────────────────────────────────────────────────────────────┘
                                    │
┌─────────────────────────────────────────────────────────────────────┐
│ 306 authorizing, at least in part via a cloud-based architecture,  │
│ at least one transmission to a target device in response to the    │
│ comparison                                                          │
└─────────────────────────────────────────────────────────────────────┘
```

FIG. 8

CONTROL OF TRANSMISSION TO A TARGET DEVICE WITH A CLOUD-BASED ARCHITECTURE

RELATED APPLICATIONS

For purposes of the USPTO extra-statutory requirements, the present application constitutes a continuation-in-part of the U.S. patent application Ser. No. 13/462,283, entitled Control of Transmission to a Target Device with a Cloud-Based Architecture, naming Robert W. Lord, Richard T. Lord, Craig J. Mundie, and Clarence T. Tegreene as inventors, filed May 2, 2012, which is currently co-pending or is an application of which a currently co-pending application is entitled to the benefit of the filing date.

For purposes of the USPTO extra-statutory requirements, the present application constitutes a continuation-in-part of the U.S. patent application Ser. No. 13/678,082, entitled Control of Transmission to a Target Device with a Cloud-Based Architecture, naming Robert W. Lord, Richard T. Lord, Craig J. Mundie, and Clarence T. Tegreene as inventors, filed Nov. 15, 2012, which is currently co-pending or is an application of which a currently co-pending application is entitled to the benefit of the filing date.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

SUMMARY

Systems, methods, computer-readable storage mediums including computer-readable instructions and/or circuitry for control of transmission to a target device with a cloud-based architecture may implement operations including, but not limited to: detecting, at least in part via a cloud-based architecture, an elapsed time since a prior authorization of a transmission to a target device; comparing, at least in part via a cloud-based architecture, the elapsed time since a prior authorization of a transmission to a target device against a threshold transmission interval associated with a target device; and authorizing, at least in part via a cloud-based architecture, at least one transmission to a target device in response to the comparison.

The foregoing summary is illustrative only and is not intended to be in any way limiting. In addition to the illustrative aspects, embodiments, and features described above, further aspects, embodiments, and features will become apparent by reference

BRIEF DESCRIPTION OF THE FIGURES

FIG. 4 shows operations for control of transmission to a target device with a cloud-based architecture.

FIG. 5 shows operations for control of transmission to a target device with a cloud-based architecture.

FIG. 6 shows operations for control of transmission to a target device with a cloud-based architecture.

FIG. 8 shows operations for control of transmission to a target device with a cloud-based architecture.

DETAILED DESCRIPTION

Figure 1:
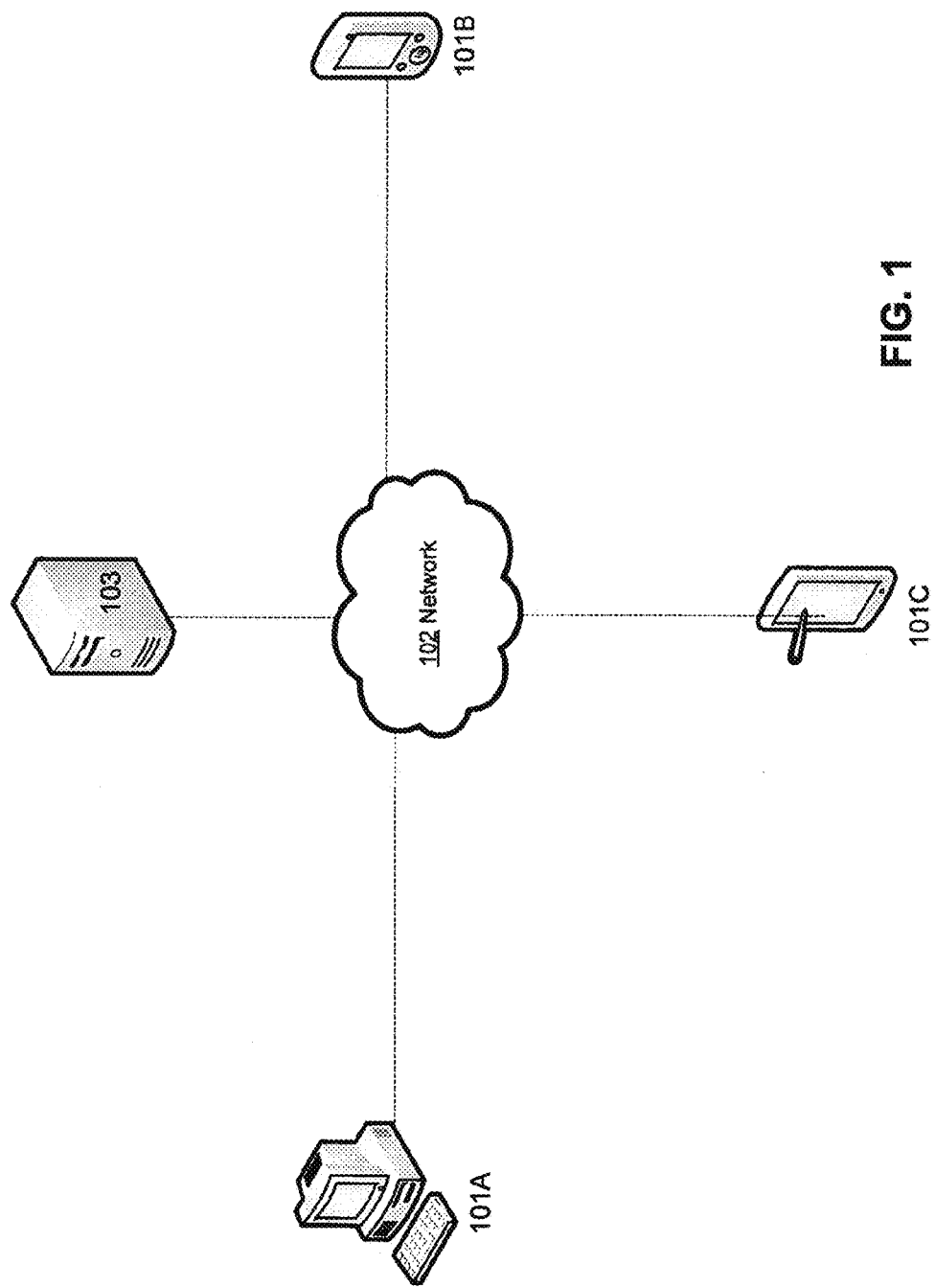
FIG. 1 shows a high-level block diagram of an operational environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a block diagram of a cloud-based computing system 100 employing a cloud-based architecture. The cloud-based computing system 100 may include a variety of computing devices 101 connected via a network 102. The network 102 may be the Internet, a Local Area Network (LAN), a wireless network (such as a wireless LAN or WLAN), or other network, or a combination of networks. The cloud-based computing system 100 may further include a cloud-based server 103, operably coupled to the computing devices 101 via the network 102.

The computing devices 101 may each be any type of computer or computing device, such as a desktop computer, laptop computer, netbook, tablet computer, mobile computing device (such as a cell phone, smartphone, personal digital assistant or other mobile or handheld or wireless computing device), or any other computer/computing device. The computing devices 101 may include one or more of a user input/output devices such as a display, keyboard, and a pointing device (such as a track ball, mouse, touch pad, touch screen or other pointing device).

The computing devices 101 may include memory to store data and software/computer instructions, a processor for executing software/computer instructions and providing overall control to the computer. The computing devices 101 may each include an operating system (OS) stored in memory and executed at startup, for example.

Figure 2:
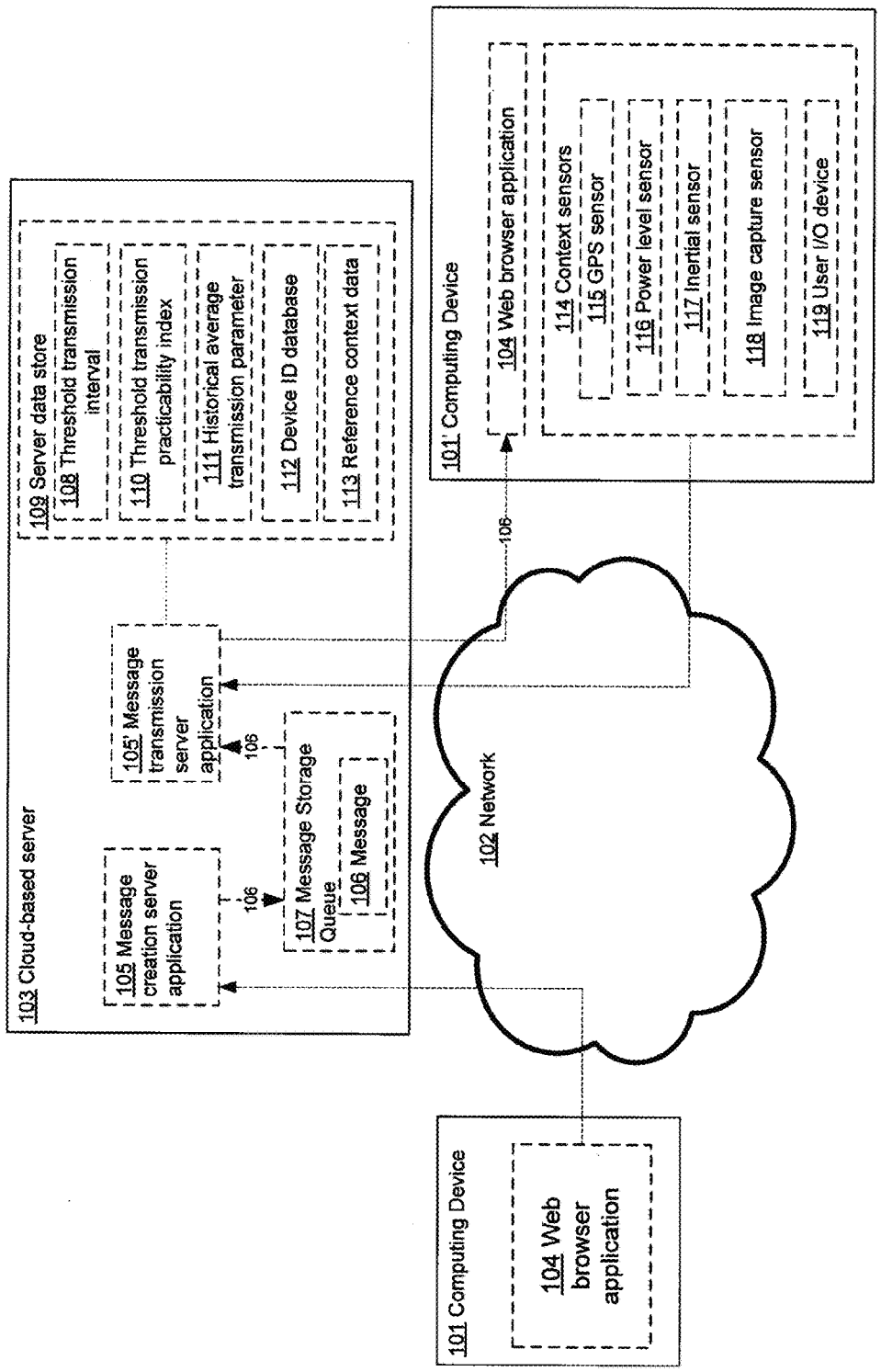
FIG. 2 shows a high-level block diagram of an operational environment.

Referring to FIG. 2, the computing devices 101 may execute or run a web browser application 104 configured to access data maintained on one or more other computing devices 101 and/or the cloud-based server 103 via the network 102.

The cloud-based server 103 (which may include a processor and memory) may run one or more applications, such as server application 105 to provide a cloud-based service (or a cloud-based computing service) where cloud-based server 103 (and/or other servers associated with the cloud-based service) may provide resources, such as software, data, media (e.g., video, audio files) and other information, and management of such resources, to computing devices 101 via the network 102.

According to an example embodiment, computing resources such as application programs and file storage may be remotely provided by the cloud-based service (e.g., by cloud-based server 103) to a computing device 101 over the network 102 through the web browser application 104 running on the computing device 101. For example, a client computing device 101 may include the web browser application 104 running applications (e.g., Java applets or other applications), which may include application programming interfaces ("API's") to more sophisticated applications (such as server application 105) running on remote servers that provide the cloud-based service (cloud-based server 103), as an example embodiment.

In an example embodiment, through the web browser application 104, a user can use a computing device 101 to log on to cloud-based services (e.g., by the web browser application 104 communicating with cloud-based server 103 of the cloud-based computing system 100) to access a server application 105. After logging-on to the server application 105, the user may create, edit, save and delete files on cloud-based server 103, and may establish (set up) or change/edit various options, such as user preferences and/or system settings, and/or may receive or download software (e.g., operating system or other software) or software updates, various data files or media files, user preferences and/or system settings, and other information previously stored on the cloud-based server 103, via the server application 105 running on the cloud-based server 103.

In an example embodiment, as shown in FIG. 2, a user of a first computing device 101 may compose a message 106 (e.g. an e-mail message, text message, instant message, or any other data transmission) for transmission to a target computing device 101 (e.g. computing device 101') via the cloud-based computing system 100. The first computing device 101 may access a message creation server application 105 running on cloud-based server 103 to compose the message 106 and the message 106 may be stored to a message storage queue 107 maintained in memory by the cloud-based server 103. The cloud-based server 103 may, in turn, employ a message transmission server application 105' to transmit one or more messages 106 stored in the message storage queue 107 to the target computing device 101'. It will be noted that the determination of when to transmit messages 106 stored in the message storage queue 107 to the target computing device 101' may carried out solely by the cloud-based server 103 architecture and not at the direction of either the transmitting computing device 101 or the target computing device 101'. Rather, the cloud-based server 103 may direct the transmission of messages 106 to the target computing device 101' according to one or more cloud-based server-defined parameters.

In an exemplary embodiment, the cloud-based server-defined parameter may be an elapsed time since a prior authorization to transmit a message 106 to a target device. For example, the message transmission server application 105' running on the cloud-based server 103 may be configured to authorize the transmission of messages 106 to the target computing device 101' only at fixed time intervals (e.g. every 15 minutes). Specifically, the message transmission server application 105' may detect an elapsed time since a prior attempted transmission of at least one message 106 and, if the elapsed time exceeds a threshold transmission interval 108 maintained by a server data store 109, the message transmission server application 105' may authorize the transmission of one or more messages 106 created by the user of the first computing device 101 (if any) during the time elapsed since a prior authorization to transmit messages 106 (e.g. a batch-type transmission of according to the server-maintained threshold transmission interval 108. The initiation of such transmissions by the message transmission server application 105' may be wholly independent of any action by the computing device 101 or the target computing device 101'.

In another exemplary embodiment, the cloud-based server-defined parameter may be a transmission practicability index computed by the cloud-based server 103 and associated with the practicability of successfully transmitting one or more messages 106 to a target computing device 101'. For example, the message transmission server application 105' may be configured to authorize the transmission of messages 106 to the target computing device 101' only when a transmission practicability index computed from localized context information associated with the target computing device 101' complies with one or more threshold metrics maintained as a threshold transmission practicability index 110 maintained by the server data store 109. Specifically, the cloud-based server 103 may receive localized context information associated with the target computing device 101' including, but not limited to, at least one of a serial number of the target computing device 101', a model number of the target computing device 101', a network address of the target computing device 101', a geographical identifier of the target computing device 101', a power indicator of the target computing device 101', a bandwidth indicator of the target computing device 101', an inertial signal associated with the target computing device 101', an imaging signal associated with the target computing device 101', or a user input/output indicator associated with the target computing device 101'. The message transmission server application 105' may compare a transmission practicability index computed from the localized context information associated with the target computing device 101' to the threshold transmission practicability index 110 and, if the transmission practicability index computed from the localized context information associated with the target computing device 101' complies with the threshold transmission practicability index 110, transmit a message 106 to the target computing device 101. Otherwise, the message 106 is retained in the message storage queue 107 until the transmission practicability index computed from the localized context information associated with the target computing device 101' complies with the threshold transmission practicability index 110, if ever.

In another exemplary embodiment, the cloud-based server-defined parameter may be a historical average transmission parameter 111. For example, the message transmission server application 105' of the cloud-based server 103 may be configured to authorize the transmission of messages 106 to the target computing device 101' only when various message parameters correspond to historical averages for those message parameters. Specifically, the cloud-based server 103 may determine a historical average message transmission length (e.g. an average amount of time required to transmit a message 106, a bit length of a message 106, etc.) associated with one or more messages 106 transmitted to the target computing device 101' by the cloud-based server 103. The message transmission server application 105' may compare a historical average message transmission length to a message transmission length of a message 106 in the message storage queue 107 and, if the currently transmission length of the message 106 corresponds to the historical average message transmission length (e.g. is within a tolerance range of the historical average message transmission length), transmit the message 106 to the target computing device 101'. Otherwise, the message 106 is retained in the message storage queue 107 until the transmission length of the message 106 complies with the historical average message transmission length, if ever.

Figure 3:
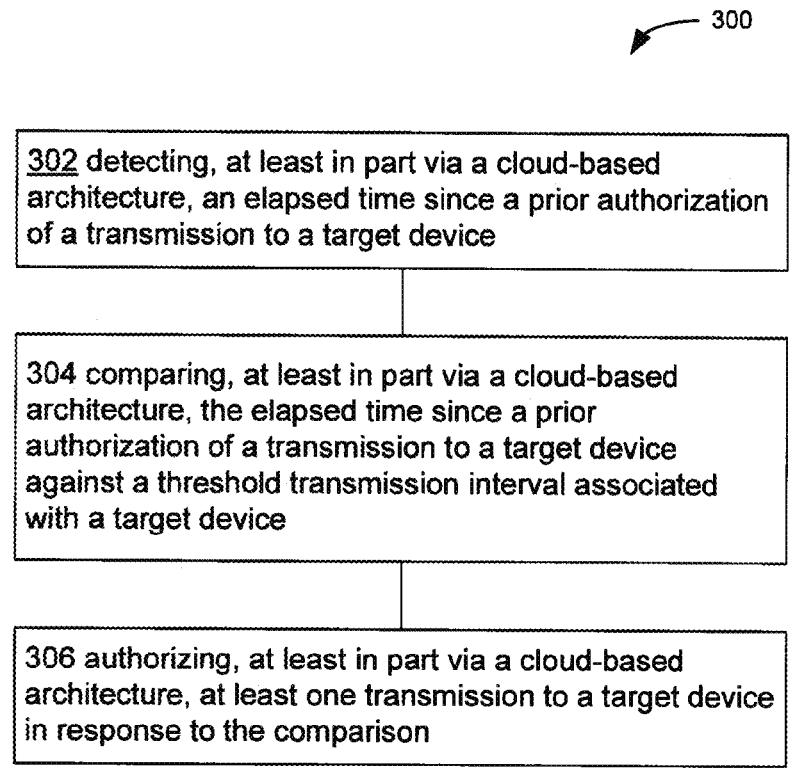
FIG. 3 shows operations for control of transmission to a target device with a cloud-based architecture.

FIG. 3 and the following figures include various examples of operational flows, discussions and explanations may be provided with respect to the above-described exemplary environment of FIGS. 1-2. However, it should be understood that the operational flows may be executed in a number of other environments and contexts, and/or in modified versions of FIGS. 1-2. In addition, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

FIG. 3 illustrates an operational procedure 300 for practicing aspects of the present disclosure including operations 302, 304 and 306.

Operation 302 illustrates detecting, at least in part via a cloud-based architecture, an elapsed time since a prior authorization of a transmission to a target device. For example, as shown in FIGS. 1-2, the message transmission server application 105' running on the cloud-based server 103 may detect an authorization (e.g. detecting the setting of a flag by the message transmission server application 105' indicative of an authorization, detecting the actual transmission of one or more messages 106 by the message transmission server application 105', etc.) of a transmission of a message 106 to a target computing device 101' and store a time-stamp associated with that transmission to the server data store 109. The message transmission server application 105' running on the cloud-based server 103 may then determine an elapsed time since the prior authorization of the first transmission of a message 106 (e.g. comparing a current value of an internal system clock to the stored time-stamp associated with that prior transmission).

Operation 304 illustrates comparing, at least in part via a cloud-based architecture, the elapsed time since a prior authorization of a transmission to a target device against a threshold transmission interval associated with a target device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 (e.g. a 15 minute threshold transmission interval) associated with (e.g. mapped to in a look-up table having entries for one or more computing devices 101) the target computing device 101' and maintained by the server data store 109 of the server data store 109.

Operation 306 illustrates authorizing, at least in part via a cloud-based architecture, at least one transmission to a target device in response to the comparison. For example, as shown in FIGS. 1-2, upon a determination that the threshold transmission interval has elapsed since a prior authorization of a transmission to the target computing device 101', the message transmission server application 105' may authorize (e.g. set a flag indicative of an authorization, transmit one or more messages 106, etc.) a transmission to the target device.

FIG. 4 illustrates an example embodiment where operation 302 of example operational flow 300 of FIG. 3 may include at least one additional operation. Additional operations may include an operation 402 and/or 404.

Operation 402 illustrates detecting, at least in part via a cloud-based architecture, an elapsed time since a prior authorization of a transmission to a target device in response to an enqueuing of a transmission. For example, as shown in FIGS. 1-2, a user of the computing device 101 may employ the message creation server application 105 to create a message 106 for transmission to the target computing device 101'. When the message 106 is ready for transmission, the message 106 may be enqueued in the message storage queue 107. In response to the enqueuing of the message 106 for transmission to the target computing device 101', the message transmission server application 105' running on the cloud-based server 103 may determine an elapsed time since a prior authorization of a transmission of a message 106 (e.g. comparing a current value of an internal system clock to the stored time-stamp associated with that prior transmission).

Operation 404 illustrates detecting, at least in part via a cloud-based architecture, an elapsed time since a prior authorization of a transmission to a target device in response to an enqueuing of a transmission. For example, as shown in FIGS. 1-2, a user of the computing device 101 may employ the message creation server application 105 to create a number of messages 106 for transmission to the target computing device 101'. When a message 106 is ready for transmission, the message 106 may be enqueued in the message storage queue 107. Over time, the message storage queue 107 may accumulate a number of messages 106 for transmission to the target computing device 101'. In response to the enqueuing of a threshold number of messages 106 for transmission to the target computing device 101' (e.g. a threshold number stored in server data store 109, a threshold number set according to a user setting, etc.), the message transmission server application 105' running on the cloud-based server 103 may determine an elapsed time since a prior authorization of transmission of one or more messages 106 (e.g. comparing a current value of an internal system clock to a stored time-stamp associated with a prior transmission).

FIG. 5 illustrates an example embodiment where operation 304 of example operational flow 300 of FIG. 3 may include at least one additional operation. Additional operations may include an operation 502, 504 and/or 506.

Operation 502 illustrates comparing, at least in part via a cloud architecture, the elapsed time since a prior authorization of a transmission to a target device against a threshold transmission interval associated with a serial number of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between multiple target computing devices 101' and maintain distinct threshold transmission intervals for each target computing device 101' or groups of target computing devices 101' based on their respective device performance characteristics, bandwidth usage, usage histories, etc. (e.g. transmissions of messages 106 to a target computing device 101' having a first serial number may occur on a different time scale than transmission of messages 106 to a target computing device 101' having a second serial number). In one embodiment, the server data store 109 may maintain a device ID database 112. The device ID database 112 may include one or more serial numbers assigned to target computing devices 101'. One or more serial numbers assigned to respective target computing devices 101' may be mapped to at least one threshold transmission interval 108 in the server data store 109. Upon enqueuing of a message 106 intended for a given target computing device 101', the message transmission server application 105' may query the target computing device 101' for its serial number, and obtain the appropriate threshold transmission interval 108 for that target computing device 101' according to the mapping between the serial number for that target computing device 101' in the device ID database 112 and the threshold transmission interval 108.

Operation 504 illustrates comparing, at least in part via a cloud architecture, the elapsed time since a prior authorization of a transmission to a target device against a threshold transmission interval associated with a model identifier of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between multiple target computing devices 101' and maintain distinct threshold transmission intervals for groups of target computing devices 101' based on their respective device performance characteristics, bandwidth usage (e.g. transmissions of messages 106 to target computing device 101' models having a multi-core processor may occur on a different time scale than transmission of messages 106 to target computing device 101' models having a single-core processor). For example, the device ID database 112 may include one or more model identifiers (e.g. a model identifier associate with a vendor of target computing devices 101' such as Apple®, Sony®, Samsung®, Google®, HTC® and/or device-specific model identifiers) associated with the target computing devices 101'. One or more model identifiers assigned to respective target computing devices 101' may be mapped to at least one threshold transmission interval 108 in the server data store 109. Upon enqueuing of a message 106 intended for a given target computing device 101', the message transmission server application 105' may query the target computing device 101' for its model identifier, and obtain the appropriate threshold transmission interval 108 for that target computing device 101' according to the mapping between the model identifier for that target computing device 101' in the device ID database 112 and the threshold transmission interval 108.

Operation 506 illustrates comparing, at least in part via a cloud architecture, the elapsed time since a prior authorization of a transmission to a target device against a threshold transmission interval associated with a network address of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between multiple target computing devices 101' and maintain distinct threshold transmission intervals for each target computing device 101' or groups of target computing devices 101' based on the network connectivity for various branches of network 102 (e.g. transmissions of messages 106 to target computing devices 101' in connected to a portion of the network 102 may occur on a different time scale than transmission of messages 106 to target computing devices 101' on a wired portion of the network 102). For example, the device ID database 112 may include one or more network addresses (e.g. IP addresses for a LAN, WAN, the Internet, etc.) associated with the target computing devices 101' connected to network 102. One or more network addresses assigned to respective target computing devices 101' may be mapped to at least one threshold transmission interval 108 in the server data store 109. Upon enqueuing of a message 106 intended for a given target computing device 101', the message transmission server application 105' may query the target computing device 101' for its network address or extract the destination network address from the message 106 itself, and obtain the appropriate threshold transmission interval 108 for that target computing device 101' according to the mapping between the network address for that target computing device 101' in the device ID database 112 and the threshold transmission interval 108.

FIG. 6 illustrates an example embodiment where operation 304 of example operational flow 300 of FIG. 3 may include at least one additional operation. Additional operations may include an operation 602.

Operation 602 illustrates comparing, at least in part via a cloud-based architecture, the elapsed time since a prior authorization of a transmission to a target device against a threshold transmission interval associated with context data associated with a target device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between varying local environments and/or network connectivity parameters based on context data (e.g. location data, connection data, environmental data) associated with a given target computing device 101'. For example, reference context data 113 may be maintained in the server data store 109. The reference context data 113 may be mapped to at least one threshold transmission interval 108 in the server data store 109. A target computing device 101' may include one or more context sensors 114. Upon enqueuing of a message 106 intended for a given target computing device 101', the message transmission server application 105' may query one or more of the context sensors 114 of the target computing device 101' to obtain context data associated with the target computing device 101'. Upon receipt of the context data from the context sensors 114, the appropriate threshold transmission interval 108 for that target computing device 101' may be determined according to the mapping between the reference context data 113 corresponding to the context data received from the context sensors 114 and the threshold transmission interval 108.

FIG. 6 further illustrates an example embodiment where operation 602 of example operational flow 300 of FIG. 6 may include at least one additional operation. Additional operations may include an operation 604, 606 and/or 608.

Operation 604 illustrates comparing, at least in part via a cloud architecture, the elapsed time since a prior authorization of a transmission to a target device against a threshold transmission interval associated with a geographical identifier of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between multiple target computing devices 101' and maintain distinct threshold transmission intervals for each target computing device 101' or groups of target computing devices 101' based on the respective geographic locations of the target computing devices 101' (e.g. transmissions of messages 106 to target computing devices 101' in a first geographic location may occur on a different time scale than transmission of messages 106 to target computing devices 101' in a second geographic location). For example, the reference context data 113 may include one or more geographic locations associated with target computing devices 101' connected to network 102. One or more geographic locations may be mapped to at least one threshold transmission interval 108 in the server data store 109. A target computing device 101' may include a global positioning system sensor 115. Upon enqueuing of a message 106 intended for a given target computing device 101', the message transmission server application 105' may query the global positioning system sensor 115 of the target computing device 101' for the geographic location of the target computing device 101' and obtain the appropriate threshold transmission interval 108 for that target computing device 101' according to the mapping between the geographic location of that target computing device 101' as determined by the global positioning system sensor 115 in the reference context data 113 and the threshold transmission interval 108.

Operation 606 illustrates comparing, at least in part via a cloud architecture, the elapsed time since a prior authorization of a transmission to a target device against a threshold transmission interval associated with a power indicator of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between multiple target computing devices 101' and maintain distinct threshold transmission intervals for each target computing device 101' or groups of target computing devices 101' based on the performance characteristics, system status, remaining battery life etc. (e.g. transmissions of messages 106 to target computing devices 101' having a high level of remaining battery life may occur on a time scale shorter than transmission of messages 106 to target computing devices 101' having a low level of remaining battery life). For example, the reference context data 113 may include one or more power level ranges associated with target computing devices 101' connected to network 102. One or more power level ranges associated with target computing devices 101' may be mapped to at least one threshold transmission interval 108 in the server data store 109. A target computing device 101' may include a power level sensor 116. Upon enqueuing of a message 106 intended for a given target computing device 101', the message transmission server application 105' may query the power level sensor 116 of the target computing device 101' for its current power level and obtain the appropriate threshold transmission interval 108 for that target computing device 101' according to the mapping between the power level ranges in the reference context data 113 and the threshold transmission interval 108.

Operation 608 illustrates comparing, at least in part via a cloud architecture, the elapsed time since a prior authorization of a transmission to a target device against a threshold transmission interval associated with an inertial signal of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between multiple target computing devices 101' and maintain distinct threshold transmission intervals for each target computing device 101' or groups of target computing devices 101' based on a usage profile of the target computing devices 101' (e.g. transmissions of messages 106 to target computing devices 101' having a high level of device usage may occur on a time scale shorter than transmission of messages 106 to target computing devices 101' having a low level of usage). For example, the reference context data 113 may include one or more usage level ranges associated with target computing devices 101' connected to network 102. One or more usage level ranges associated with target computing devices 101' may be mapped to at least one threshold transmission interval 108 in the server data store 109. A target computing device 101' may include an inertial sensor 117 configured to detect motion of the target computing device 101' indicative of use of the target computing device 101'. Upon enqueuing of a message 106 intended for a given target computing device 101', the message transmission server application 105' may query the inertial sensor 117 of the target computing device 101' for an indication of usage of the target computing device 101' and obtain the appropriate threshold transmission interval 108 for that target computing device 101' according to the mapping between the usage level ranges in the reference context data 113 and the threshold transmission interval 108.

Figure 7:
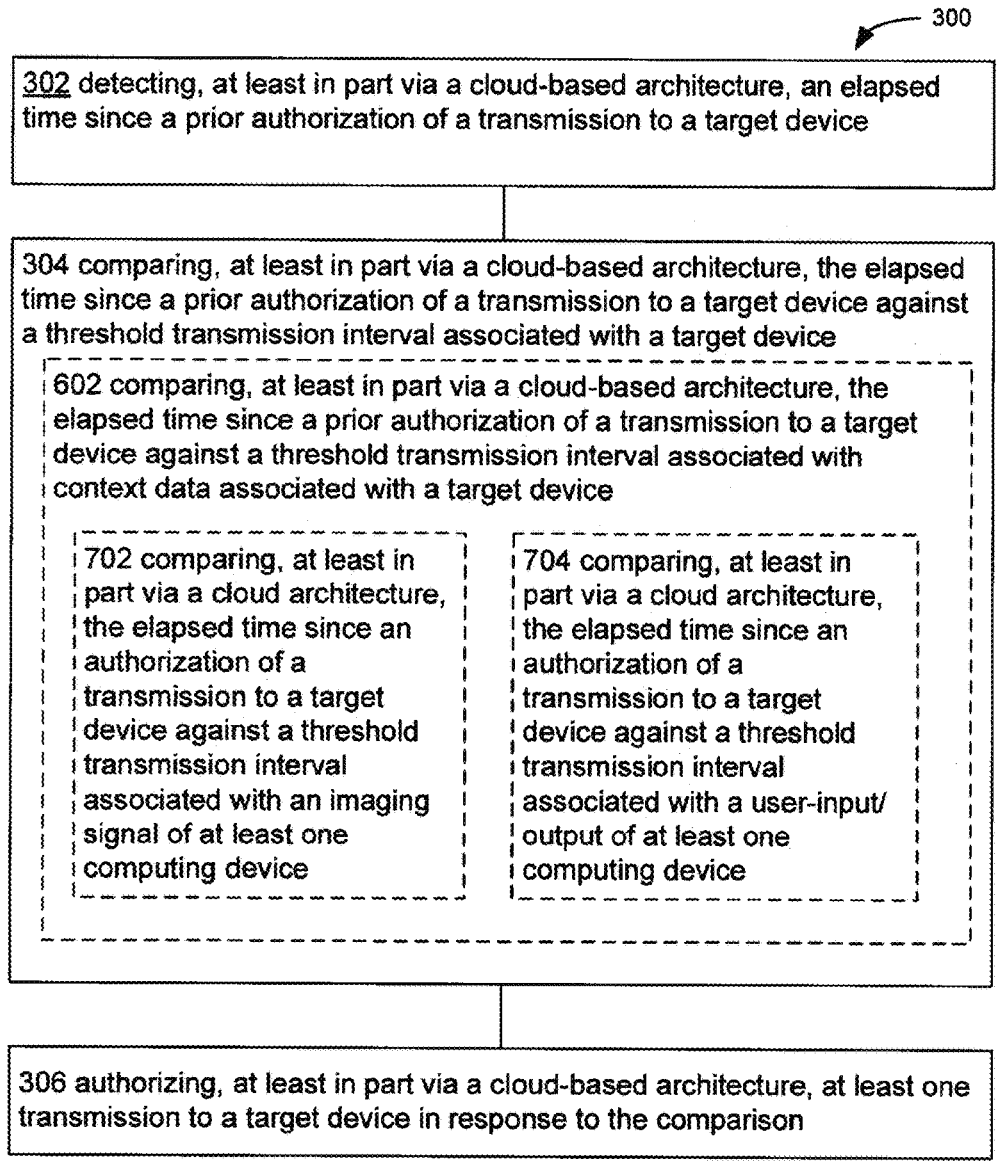
FIG. 7 shows operations for control of transmission to a target device with a cloud-based architecture.

FIG. 7 illustrates an example embodiment where operation 602 of example operational flow 300 of FIG. 6 may include at least one additional operation. Additional operations may include an operation 702 and/or 704.

Operation 702 illustrates comparing, at least in part via a cloud architecture, the elapsed time since a prior authorization of a transmission to a target device against a threshold transmission interval associated with an imaging signal of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between multiple target computing devices 101' and maintain distinct threshold transmission intervals for each target computing device 101' or groups of target computing devices 101' based on the respective environment or geographic locations of the target computing devices 101' (e.g. transmissions of messages 106 to target computing devices 101' in a first environment or location (e.g. an office during the daytime) may occur on a different time scale than transmission of messages 106 to target computing devices 101' in a second environment or location (e.g. a home at during the night)). For example, the reference context data 113 may include one or more environments associated with target computing devices 101' connected to network 102. One or more environments may be mapped to at least one threshold transmission interval 108 in the server data store 109. A target computing device 101' may include a image capture sensor 118. Upon enqueuing of a message 106 intended for a given target computing device 101', the message transmission server application 105' may query the image capture sensor 118 of the target computing device 101' to obtain an image of the current environment of the target computing device 101'. The image of the environment may be analyzed (e.g. by image recognition software running on the cloud-based server 103) to determine the current environment so as to obtain the appropriate threshold transmission interval 108 for that target computing device 101' according to the mapping between the current environment of that target computing device 101' (as determined by the image capture sensor 118 and/or image recognition software) in the reference context data 113 and the threshold transmission interval 108.

Operation 704 illustrates comparing, at least in part via a cloud architecture, the elapsed time since a prior authorization of a transmission to a target device against a threshold transmission interval associated with a user-input/output of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between multiple target computing devices 101' and maintain distinct threshold transmission intervals for each target computing device 101' or groups of target computing devices 101' based on a usage profile of the target computing devices 101' (e.g. transmissions of messages 106 to target computing devices 101' having a high level of device usage may occur on a time scale shorter than transmission of messages 106 to target computing devices 101' having a low level of usage). For example, the reference context data 113 may include one or more usage level ranges associated with target computing devices 101' connected to network 102. One or more usage level ranges associated with target computing devices 101' may be mapped to at least one threshold transmission interval 108 in the server data store 109. A target computing device 101' may include a user input/output device 119 (e.g. a touchscreen, a keypad, a display, a microphone, a speaker, etc.) configured to receive/provide user input/output of the target computing device 101'. Such user input/output may be indicative of use of the target computing device 101'. Upon enqueuing of a message 106 intended for a given target computing device 101', the message transmission server application 105' may query the target computing device 101' for an indication of a number of user inputs/outputs having occurred via the user input/output device 119 of the target computing device 101' and obtain the appropriate threshold transmission interval 108 for that target computing device 101' according to the mapping between the usage level ranges in the reference context data 113 and the threshold transmission interval 108.

FIG. 8 illustrates an example embodiment where operation 602 of example operational flow 300 of FIG. 6 may include at least one additional operation. Additional operations may include an operation 802, 804 and/or 808.

Operation 802 illustrates comparing, at least in part via a cloud architecture, the elapsed time since a prior authorization of a transmission to a target device against a threshold transmission interval associated with a signal strength of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between target computing devices 101' having differing network connectivity (e.g. transmissions of messages 106 to target computing devices 101' via a network 102 connection having a first signal strength may occur on a different time scale than transmission of messages 106 to target computing devices 101' via a network 102 connection having a second signal strength). For example, the reference context data 113 may include one or more signal strength ranges associated with communications signal strengths for target computing devices 101' connected to network 102. One or more signal strength ranges may be mapped to at least one threshold transmission interval 108 in the server data store 109. Upon enqueuing of a message 106 intended for a given target computing device 101', the message transmission server application 105' may query the network 102 and/or the target computing device 101' for the signal strength between the target computing device 101' and the network 102 and obtain the appropriate threshold transmission interval 108 for that target computing device 101' according to the mapping between the signal strength ranges of the reference context data 113 and the threshold transmission interval 108.

Operation 804 illustrates comparing, at least in part via a cloud architecture, the elapsed time since a prior authorization of a transmission to a target device against a threshold transmission interval associated with a bandwidth of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between target computing devices 101' having differing network connectivity (e.g. transmissions of messages 106 to target computing devices 101' via a network 102 connection having a first bandwidth may occur on a different time scale than transmission of messages 106 to target computing devices 101' via a network 102 connection having a second bandwidth). For example, the reference context data 113 may include one or more bandwidth ranges associated with communications bandwidths for target computing devices 101' connected to network 102. One or more bandwidth ranges may be mapped to at least one threshold transmission interval 108 in the server data store 109. Upon enqueuing of a message 106 intended for a given target computing device 101', the message transmission server application 105' may query the network 102 and/or the target computing device 101' for the bandwidth between the target computing device 101' and the network 102 and obtain the appropriate threshold transmission interval 108 for that target computing device 101' according to the mapping between the bandwidth ranges of the reference context data 113 and the threshold transmission interval 108.

Operation 806 illustrates comparing, at least in part via a cloud architecture, the elapsed time since a prior authorization of a transmission to a target device against a threshold transmission interval associated with a connection type of at least one computing device. For example, as shown in FIGS. 1-2, upon the computation of an elapsed time since a prior authorization of a transmission to a target computing device 101' as described with respect to operation 302, the message transmission server application 105' may compare that elapsed time since the prior authorization of the transmission of a message 106 to a threshold transmission interval 108 associated with the target computing device 101' and maintained by the server data store 109 of the server data store 109. It may be the case that the message transmission server application 105' may discriminate between target computing devices 101' having differing network connectivity (e.g. transmissions of messages 106 to target computing devices 101' via a wired network 102 connection type may occur on a different time scale than transmission of messages 106 to target computing devices 101' having a wireless network 102 connection type). For example, the reference context data 113 may include one or more network connection types for target computing devices 101' connected to network 102. One or more network connection types may be mapped to at least one threshold transmission interval 108 in the server data store 109. Upon enqueuing of a message 106 intended for a given target computing device 101', the message transmission server application 105' may query the network 102 and/or the target computing device 101' for the network connection type between the target computing device 101' and the network 102 and obtain the appropriate threshold transmission interval 108 for that target computing device 101' according to the mapping between a network connection type of the reference context data 113 and the threshold transmission interval 108.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed is:

1. A system, comprising:
   circuitry configured for receiving a first electronic message for transmission to a target computing device and a second electronic message for transmission to the target computing device;
   circuitry configured for authorizing transmission of the first electronic message to the target computing device;
   circuitry configured for querying an image capture sensor of the target computing device to obtain an image of a current environment of the target computing device;
   circuitry configured for analyzing the image of the current environment of the target computing device to determine a context of the target computing device;
   circuitry configured for determining a threshold transmission time interval according to a mapping between the context of the target computing device and reference context data;
   circuitry configured for comparing an elapsed time since the authorizing transmission of the first electronic message to the target computing device with the threshold transmission time interval; and
   circuitry configured for, in response to the circuitry configured for comparing, authorizing transmission of the second electronic message to the target computing device when the threshold transmission time interval has elapsed following the authorizing transmission of the first electronic message to the target computing device.

2. The system of claim 1, wherein circuitry configured for receiving a first electronic message for transmission to a target computing device and a second electronic message for transmission to the target computing device comprises:
   circuitry configured for receiving the first electronic message and the second electronic message at a cloud-based server in communication with the target computing device, the receiving at least in part via a communications network.

3. The system of claim 1, wherein circuitry configured for determining a threshold transmission time interval according to a mapping between the context of the target computing device and reference context data comprises:
   circuitry configured for determining a threshold transmission time interval according to a mapping between the context of the target computing device and reference context data associated with the target computing device obtained at least in part using a serial number of the target computing device.

4. The system of claim 1, wherein circuitry configured for determining a threshold transmission time interval according to a mapping between the context of the target computing device and reference context data comprises:
   circuitry configured for determining a threshold transmission time interval according to a mapping between the context of the target computing device and reference context data associated with the target computing device obtained at least in part using a model identifier of the target computing device.

5. The system of claim 1, wherein circuitry configured for determining a threshold transmission time interval according to a mapping between the context of the target computing device and reference context data comprises:
   circuitry configured for determining a threshold transmission time interval according to a mapping between the context of the target computing device and reference context data associated with the target computing device obtained at least in part using a network address of the target computing device.

6. The system of claim 1, wherein circuitry configured for determining a threshold transmission time interval according to a mapping between the context of the target computing device and reference context data comprises:
   circuitry configured for determining a threshold transmission time interval according to a mapping between the context of the target computing device and reference context data associated with a geographical identifier of the target computing device.

7. The system of claim 1, wherein circuitry configured for determining a threshold transmission time interval according to a mapping between the context of the target computing device and reference context data comprises:
   circuitry configured for determining a threshold transmission time interval according to a mapping between the context of the target computing device and reference context data and based at least in part on a power indicator of the target computing device.

8. The system of claim 1, wherein circuitry configured for determining a threshold transmission time interval according to a mapping between the context of the target computing device and reference context data comprises:
   circuitry configured for determining a threshold transmission time interval according to a mapping between the context of the target computing device and reference context data and based at least in part on an inertial signal of the target computing device.

9. The system of claim 1, wherein circuitry configured for analyzing the image of the current environment of the target computing device to determine a context of the target computing device comprises:
   circuitry configured for using image recognition software on the image obtained from the target computing device to determine the current environment of the target computing device as the context of the target computing device.

10. The system of claim 9, wherein circuitry configured for using image recognition software on the image obtained from the target computing device to determine the current environment of the target computing device as the context of the target computing device comprises:
    circuitry configured for using image recognition software running on a cloud-based server associated with querying the image capture sensor of the target computing device on the image obtained from the target computing device to determine the current environment of the target computing device as the context of the target computing device.

11. The system of claim 1, wherein circuitry configured for determining a threshold transmission time interval according to a mapping between the context of the target computing device and reference context data comprises:
    circuitry configured for determining a threshold transmission time interval according to a mapping between the context of the target computing device and reference context data and based at least in part on a signal strength of the target computing device.

12. The system of claim 1, wherein circuitry configured for determining a threshold transmission time interval according to a mapping between the context of the target computing device and reference context data comprises:
  circuitry configured for determining a threshold transmission time interval according to a mapping between the context of the target computing device and reference context data and based at least in part on a bandwidth of the target computing device.

13. A method, comprising:
  receiving a first electronic message for transmission to a target computing device and a second electronic message for transmission to the target computing device;
  authorizing transmission of the first electronic message to the target computing device;
  querying an image capture sensor of the target computing device to obtain an image of a current environment of the target computing device;
  analyzing the image of the current environment of the target computing device to determine a context of the target computing device;
  determining a threshold transmission time interval according to a mapping between the context of the target computing device and reference context data;
  comparing an elapsed time since the authorizing transmission of the first electronic message to the target computing device with the threshold transmission time interval; and
  in response to the comparing, authorizing transmission of the second electronic message to the target computing device when the threshold transmission time interval has elapsed following the authorizing transmission of the first electronic message to the target computing device,
  wherein at least one of the receiving, authorizing, querying, analyzing, determining, or comparing is at least partially implemented using at least one processing device.

14. The system of claim 1, wherein circuitry configured for determining a threshold transmission time interval according to a mapping between the context of the target computing device and reference context data comprises:
  circuitry configured for determining a threshold transmission time interval according to a mapping between of the context of the target computing device and the reference context data and based at least in part on a connection type of the target computing device.

15. The system of claim 14, wherein circuitry configured for determining a threshold transmission time interval according to a mapping between the context of the target computing device and the reference context data and based at least in part on a connection type of the target computing device comprises:
  circuitry configured for determining a threshold transmission time interval based at least in part on whether the context of the target computing device indicated by the image of the current environment of the target computing device is indicative of availability of a type of wireless connectivity.

16. The system of claim 15, wherein circuitry configured for determining a threshold transmission time interval based at least in part on whether the context of the target computing device indicated by the image of the current environment of the target computing device is indicative of availability of a type of wireless connectivity comprises:
  circuitry configured for determining a threshold transmission time interval based at least in part on whether the current environment of the target computing device is outdoors and, if the current environment of the target computing device is outdoors, setting a threshold transmission time interval appropriate for cellular networking.

17. A system, comprising:
at least one computing device; and
one or more instructions that, when implemented in the computing device, program the at least one computing device for:
  receiving a first electronic message for transmission to a target computing device and a second electronic message for transmission to the target computing device;
  authorizing transmission of the first electronic message to the target computing device;
  querying an image capture sensor of the target computing device to obtain an image of a current environment of the target computing device;
  analyzing the image of the current environment of the target computing device to determine a context of the target computing device;
  determining a threshold transmission time interval according to a mapping between the context of the target computing device and reference context data;
  comparing an elapsed time since the authorizing transmission of the first electronic message to the target computing device with the threshold transmission time interval; and
  in response to the comparing, authorizing transmission of the second electronic message to the target computing device when the threshold transmission time interval has elapsed following the authorizing transmission of the first electronic message to the target computing device.

18. An article of manufacture, comprising:
at least one non-transitory computer-readable medium including at least:
  one or more instructions for receiving a first electronic message for transmission to a target computing device and a second electronic message for transmission to the target computing device;
  one or more instructions for authorizing transmission of the first electronic message to the target computing device;
  one or more instructions for querying an image capture sensor of the target computing device to obtain an image of a current environment of the target computing device;
  one or more instructions for analyzing the image of the current environment of the target computing device to determine a context of the target computing device;
  one or more instructions for determining a threshold transmission time interval according to a mapping between the context of the target computing device and reference context data;
  one or more instructions for comparing an elapsed time since the authorizing transmission of the first electronic message to the target computing device with the threshold transmission time interval; and
  one or more instructions for, in response to the one or more instructions for the comparing, authorizing transmission of the second electronic message to the target computing device when the threshold transmission time interval has elapsed following the authorizing transmission of the first electronic message to the target computing device.

19. The system of claim 1, wherein circuitry configured for querying an image capture sensor of the target computing device to obtain an image of a current environment of the target computing device comprises:
  circuitry configured for transmitting a request to the target computing device, the target computing device including at least one of a cell phone or a smartphone, for the target computing device to capture an image of the current environment of the target computing device using an image capture sensor of the target computing device.

20. The system of claim 1, wherein circuitry configured for determining a threshold transmission time interval according to a mapping between the context of the target computing device and reference context data comprises:
  circuitry configured for determining a threshold time interval according to a mapping between the context of the target computing device and historical context information including at least one of a historical average transmission parameter, a historical average message transmission length, or a historical average amount of time required to transmit a message, the historical context information associated with the target computing device.

21. The system of claim 20, wherein circuitry configured for determining a threshold time interval according to a mapping between the context of the target computing device and historical context information including at least one of a historical average transmission parameter, a historical average message transmission length, or a historical average amount of time required to transmit a message, the historical context information associated with the target computing device comprises:
  circuitry configured for determining a threshold time interval according to a mapping between the context of the target computing device and historical context information associated with one or more instances of the target computing device previously being within the environment indicated by the context of the target computing device.

22. The system of claim 21, wherein circuitry configured for determining a threshold time interval according to a mapping between the context of the target computing device and historical context information associated with one or more instances of the target computing device previously being within the environment indicated by the context of the target computing device comprises:
  circuitry configured for determining a threshold time interval according to a mapping between the context of the target computing device and at least one historical average transmission length associated with one or more instances of the target computing device previously being within the environment indicated by the context of the target computing device.

23. The system of claim 1, wherein circuitry configured for analyzing the image of the current environment of the target computing device to determine a context of the target computing device comprises:
  circuitry configured for using image recognition software on the image obtained from the target computing device to determine the context of the target computing device; and
  wherein circuitry configured for determining a threshold transmission time interval according to a mapping between the context of the target computing device and reference context data includes at least:
    circuitry configured for determining a threshold transmission time interval appropriate for the target computing device in the particular current environment of the target computing device from the reference context data associated with the target computing device accessed via the mapping.

24. The system of claim 1, wherein circuitry configured for determining a threshold transmission time interval according to a mapping between the context of the target computing device and reference context data comprises:
  circuitry configured for determining a threshold transmission time interval according to a mapping between the context of the target computing device and reference context data and based at least in part on one or more inputs to the target computing device.

25. The system of claim 24, wherein circuitry configured for determining a threshold transmission time interval according to a mapping between the context of the target computing device and reference context data and based at least in part on one or more inputs to the target computing device comprises:
  circuitry configured for determining a threshold transmission time interval according to a mapping between the context of the target computing device and reference context data and based at least in part on one or more inputs to the target computing device indicative of use of the target computing device by a user.

26. The system of claim 25, wherein circuitry configured for determining a threshold transmission time interval according to a mapping between the context of the target computing device and with the reference context data and based at least in part on one or more inputs to the target computing device indicative of use of the target computing device by a user comprises:
  circuitry configured for determining a threshold transmission time interval according to a mapping between the context of the target computing device and reference context data and based at least in part on one or more keyboard inputs to the target computing device indicative of use of the target computing device by a user.

27. The system of claim 26, wherein circuitry configured for determining a threshold transmission time interval according to a mapping between the context of the target computing device and reference context data and based at least in part on one or more keyboard inputs to the target computing device indicative of use of the target computing device by a user comprises:
  circuitry configured for querying the target computing device to obtain a number of keyboard inputs to the target computing device since transmission of the first electronic message to the target computing device; and
  circuitry configured for determining a threshold transmission time interval according to a mapping between of the context of the target computing device and reference context data and based at least in part on the number of keyboard inputs to the target computing device since transmission of the first electronic message to the target computing device.

28. The system of claim 1, wherein circuitry configured for determining a threshold transmission time interval according to a mapping between the context of the target computing device and reference context data comprises:
  circuitry configured for determining a threshold transmission time interval according to a mapping between the context of the target computing device and reference context data and based at least in part on one or more outputs of the target computing device.

29. The system of claim 7, wherein circuitry configured for determining a threshold transmission time interval according to a mapping between the context of the target computing device and reference context data and based at least in part on a power indicator of the target computing device comprises:
   circuitry configured for determining a threshold transmission time interval according to a mapping between the context of the target computing device and reference context data and based at least in part on a remaining battery life of the target computing device.

30. The system of claim 29, wherein circuitry configured for determining a threshold transmission time interval according to a mapping between the context of the target computing device and reference context data and based at least in part on a remaining battery life of the target computing device comprises:
   circuitry configured for querying the target computing device to obtain the remaining battery life of the target computing device; and
   circuitry configured for determining a low threshold transmission time interval based at least in part on an indication of a high level of remaining battery life of the target computing device, the low threshold transmission time interval indicative of one or more transmissions of messages to the target computing device occurring on a time scale, the time scale determined by the threshold transmission time interval, shorter than a time scale for transmission of messages when the target computing device has a low level of remaining battery life.

31. The system of claim 1, wherein circuitry configured for receiving a first electronic message for transmission to a target computing device and a second electronic message for transmission to the target computing device comprises:
   circuitry configured for receiving a first text message for transmission to a target mobile computing device and a second text message for transmission to the target mobile computing device, the target mobile computing device including at least one of a cell phone or a smartphone.

32. The system of claim 1, wherein circuitry configured for authorizing transmission of the first electronic message to the target computing device comprises:
   circuitry configured for transmitting, by a cloud-based server in communication with the target computing device, the first electronic message to the target computing device.

33. The system of claim 1, wherein circuitry configured for authorizing transmission of the first electronic message to the target computing device comprises:
   circuitry configured for setting a flag indicative of authorization for transmission of the first electronic message to the target computing device.

34. The system of claim 1, wherein circuitry configured for, in response to the circuitry configured for comparing, authorizing transmission of the second electronic message to the target computing device when the threshold transmission time interval has elapsed following the authorizing transmission of the first electronic message to the target computing device comprises:
   circuitry configured for authorizing transmission of the second electronic message to the target computing device if an elapsed time since the authorizing transmission of the first electronic message to the target computing device exceeds the threshold time transmission interval.

35. The system of claim 1, further comprising:
   circuitry configured for determining that the elapsed interval does not exceed the threshold transmission time interval and retaining the second electronic message in a message storage queue until the elapsed interval exceeds the threshold transmission time interval subsequent to one or more additional comparisons.

36. The system of claim 1, wherein circuitry configured for determining a threshold transmission time interval according to a mapping between the context of the target computing device and reference context data comprises:
   circuitry configured for computing a transmission practicability index associated with practicability of successfully transmitting one or more messages to the target computing device according to the mapping between the context of the target computing device and the reference context data; and
   circuitry configured for determining a threshold transmission time interval based at least in part on the transmission practicability index.

* * * * *